United States Patent
Ozawa

(10) Patent No.: US 9,606,559 B2
(45) Date of Patent: Mar. 28, 2017

(54) MULTI-PHASE SWITCHING CONVERTER WITH PHASE SHEDDING

(71) Applicant: Dialog Semiconductor (UK) Limited, London (GB)

(72) Inventor: Seiichi Ozawa, Wakoh (JP)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/834,784

(22) Filed: Aug. 25, 2015

(65) Prior Publication Data

US 2017/0060154 A1 Mar. 2, 2017

(51) Int. Cl.
*H02M 3/158* (2006.01)
*G05F 1/575* (2006.01)

(52) U.S. Cl.
CPC ............ *G05F 1/575* (2013.01); *H02M 3/158* (2013.01)

(58) Field of Classification Search
CPC ......... H02M 3/156; H02M 2003/1566; H02M 3/158; H02M 3/1584; H02M 2001/0003; H02M 2001/0009; H02M 2001/0025
See application file for complete search history.

(56) References Cited

U.S. PATENT DOCUMENTS

| | | | |
|---|---|---|---|
| 6,674,274 B2 | 1/2004 | Hobrecht et al. | |
| 7,999,520 B2 | 8/2011 | Luo et al. | |
| 8,067,924 B2 | 11/2011 | McDonald et al. | |
| 8,242,759 B2 * | 8/2012 | Carroll | G06F 1/26 323/272 |
| 8,294,438 B2 | 10/2012 | Wickersham et al. | |
| 8,319,484 B2 * | 11/2012 | Houston | H02M 3/156 323/272 |
| 8,710,810 B1 * | 4/2014 | McJimsey | H02M 3/1584 323/272 |

(Continued)

FOREIGN PATENT DOCUMENTS

DE 10 2007 045 220 9/2007

OTHER PUBLICATIONS

"A Novel Phase-Shedding Control Scheme for Improved Light Load Efficiency of Multiphase Interleaved DC-DC Converters," by Jen-Ta Su et al., IEEE Transactions on Power Electronics, vol. 28, No. 10, Oct. 2013, pp. 4742-4752.

(Continued)

*Primary Examiner* — Gary L Laxton
(74) *Attorney, Agent, or Firm* — Saile Ackerman LLC; Stephen B. Ackerman; Billy Knowles

(57) ABSTRACT

A multi-phase switched-mode converter has a control circuit configured to receive a shed threshold signal indicating that the total output current has fallen below a total current threshold level. The control circuit further includes slave phase shedding switches that have a common switching pole connected to a current share amplifier of each slave power stage, a first select pole is connected to a phase target current level, and a second select pole is connected to a phase zero target current level. A control terminal is connects the phase zero target current signal to each slave power stage to decreases their output currents to approximately a zero level. When the output current approaches the zero level, the slave power stages are deactivated. A panic circuit activates the slave power stages when the load current increases precipitously.

26 Claims, 8 Drawing Sheets

(56) References Cited

U.S. PATENT DOCUMENTS

| | | | | |
|---|---|---|---|---|
| 8,829,872 | B1 * | 9/2014 | Pierson | H02M 1/14 |
| | | | | 323/272 |
| 8,907,642 | B1 * | 12/2014 | Burstein | H02M 3/1584 |
| | | | | 323/272 |
| 2008/0197824 | A1 | 8/2008 | Qiu et al. | |
| 2008/0272752 | A1 * | 11/2008 | Qiu | H02M 3/1584 |
| | | | | 323/272 |
| 2009/0152949 | A1 | 6/2009 | Adragna et al. | |
| 2009/0327786 | A1 | 12/2009 | Carroll et al. | |

OTHER PUBLICATIONS

"Controller Design Issues and Solutions for Buck Converters with Phase Shedding and AVP Functions," by Liyu Yand et al., Energy Conversion Congress and Exposition, Sep. 20, 2009. ECCE 2009, IEEE, pp. 2862-2868.

"Digital Time-Optimal Phase Shedding in Multiphase Buck Converters," by A. Costabeber et al., IEEE Transactions on Power Electronics, vol. 25, Sep. 9, 2010, pp. 2242-2247.

German Search Report, Appliciation No. 10 2015 222 579.8, Applicant: Dialog Semiconductor (UK) Limited, Mail date: May 2, 2016, 6 pgs., and English Language Translation, 6 pgs.

\* cited by examiner

MULTI-PHASE SWITCHING CONVERTER WITH PHASE SHEDDING

TECHNICAL FIELD

This disclosure relates generally to a switched-mode power converter circuits. More particularly, this disclosure relates to multiple phase switched-mode power converter circuits. Even more particularly, this disclosure relates to multiple phase switched-mode power converter circuits with phase shedding.

BACKGROUND

As is known in the art, switched-mode power supply circuits incorporate a switching regulator to convert electrical power efficiently. The switched-mode power supply circuits transfer power from a source to a load while converting voltage and current applied to the input of the circuit to an output voltage and current suitable for the load. The switched-mode power supply circuits consist of a power stage and a control circuit. The power stage performs the basic power conversion from the input voltage to the output voltage and includes switches and the output filter. The control stage receives necessary feedback signals from the power stage and control signals from system operating functions. The feedback and control signals are interpreted to provide the driving signals for the power stage.

In current hand-held mobile electronic devices such as cellular telephones, tablet computers, portable media players and the like require a higher dynamic range of output current from the switched-mode power supply circuits. What is needed is that as the range of output currents requirements expands, the switched-mode power supply circuits must operate more efficiently over a broad range of output currents.

Multi-phase switched-mode power supply circuits include a quantity of switched-mode converter circuits that are coupled in parallel to deliver high output currents to a load. The multiple parallel switched-mode converter circuits provide an energy efficient DC/DC converter for supplying high output currents. The corresponding switching transistors in each switching stage may be switched so that input current flows into only one or more regulator stage at a time. The switching stages switch sequentially to avoid simultaneous switching and to smooth the input/output current to reduce the amplitude of the output ripple current, input ripple current, and output ripple voltage.

Switching loss and DC loss degrades the efficiency of a switched-mode converter circuit. The DC loss is due to the voltage drop across resistances such as on-resistance of the switching devices in the power stage and it is proportional to the square of the load current. Contribution to the efficiency is proportional to the load current and dominant for higher load current. To improve the efficiency for higher load current, activating multiple phases in parallel reduces effective on-resistance. However, switching loss of the switching devices in the power stage is almost constant regardless of the load current. For lower load current, the switching loss contribution becomes dominant, as the DC loss is essentially negligible. At the lower load currents, the number of active phases should be minimized for reducing the switching loss and improving the efficiency.

FIG. 1 is a plot of efficiency of a single phase switched-mode converter circuit and a four phase switched-mode converter circuit versus output current of the prior art. The output current 5 of the single phase switched-mode converter circuit is more efficient than the output current 10 of the four phase switched-mode converter circuit until the output current level reaches the crossover current level t0 that in this example is approximately 1.6 A. Once the load current is greater than the crossover current level t0, the four phase switched-mode converter circuit is efficient.

SUMMARY

An object of this disclosure is to provide a multi-phase switched-mode converter circuit that is able to drop or shed and add phases to dynamically maintain the operating load while continuing to provide efficient operation and avoid any transient voltage changes.

To accomplish at least this object, a multi-phase switched-mode power converter circuit has multiple power stages coupled in parallel having their output terminals connected to a load circuit. Each input of the power stage is connected to a control circuit that adjusts operational signals of the multiple power stages. The control circuit includes multiple phase control and feedback sections. Each of the multiple phase control and feedback sections is associated with one power stage of multiple powers stages. Each of the phase control and feedback sections has a pulse width modulator that provides the drive signals for the associated power stage. Each of the phase control and feedback sections includes a multiple current sense circuit that connected such that the multiple current sense circuit determines an output current for the one power stage.

An output current magnitude signal of each of the current sense circuits indicates the magnitude of the output current flowing in each of the power stages of the multi-phase switched-mode power converter circuit. The output current magnitude signal of each of the current sense circuits is an input to a current estimator. The current estimator combines the output current magnitude signals to estimate a magnitude of a total output current of the multi-phase switched-mode power converter circuit.

The estimate of the magnitude of the total output current is applied to a phase threshold comparator that determines if the magnitude of the total output current is greater than or less than a current threshold. The current threshold indicating that the magnitude of the total output current has fallen below a level such that the multi-phase switched-mode power converter circuit is no longer operating efficiently.

One power stage of the multi-phase switched-mode power converter circuit is designated as a master power stage with the remaining power stages being designated as slave power stages. The current sense circuit of the associated phase control and feedback sections with master power stage will provide the sensed current magnitude signal from the phase control and feedback sections of the master power stage that is transferred to each of phase control and feedback sections of the associated with the slave power stages. The sensed current magnitude signal from the phase control and feedback sections associated with the master power stage equalizes the current in each of the slave power stages to insure the best efficiency that occurs when all the phase currents are equal.

Each phase control and feedback section includes a shedding switch. The shedding switch receives the stage target current to a first terminal and a zero current reference signal to a second terminal. The common terminal of each shedding switch is connected to a non-inverting terminal of a current share amplifier within each of the phase control and feedback sections. The inverting terminal of the current share amplifier is connected to an output terminal of an associated current sense amplifier. The output of the current share amplifier is connected to a first terminal of a summing circuit within each of the phase control and feedback sections associated with each of the slave power stages. The second terminal of each of the summing circuits receives an error signal from an error amplifier included in the control circuit. The output of each summing amplifier is applied to the pulse width modulator that determines the operation of each of the slave power stages. In the phase control and feedback section associated with the master power stage, the error signal is applied directly to the pulse width modulator.

The output of the phase threshold comparator is applied to a phase shedding control circuit. The phase shedding control circuit then generates multiple phase target signals as outputs of the phase shedding control circuit. The phase target signals are applied to control terminals of each of the shedding switches of the phase control and feedback sections. A first logic level activates the shedding switch such that the associated power stage follows the current of the master power stage. A second logic level activates the shedding switch such that the associated power stage follows a zero target biasing voltage source included within the control circuit.

When the output currents of each of the slave power stages have reached a zero magnitude, the phase shedding control circuit generates a phase enable signal. The phase enable signals are transferred to the pulse width modulators of each of the phase control and feedback sections to disable each of the slave power stages.

When the magnitude of the total output current as applied to the phase threshold comparator is greater than the current threshold, the output of the phase threshold comparator switches state and the phase shedding control circuit generates the phase target signals to cause the shedding switches to transfer the stage target current signal to each of the current share amplifiers. The phase enable signals are generated to enable all of the slave power stages. The current share amplifiers then have their non-inverting inputs set to be connected to receive the signal indicative of the current of the master power stage. The phase control and feedback sections control the switching of each of the slave power stages to follow the current of the master power stage and each of the power stages of the multi-phase switched-mode power converter are restored to full operation.

In some embodiments, the control circuit includes a panic comparator for instantaneously activating the disabled slave power stages when the load current increases precipitously. The panic comparator receives the output voltage of the multi-phase switched-mode power converter circuit at an inverting input. A predetermined offset voltage is connected to the non-inverting terminal of the panic comparator. When the output voltage decreases below the level of the predetermined offset voltage, the panic initiation signal from the output of the panic comparator is transferred to the phase shedding control circuit. The phase shedding control circuit then generates a phase enable signal that is transferred to the pulse width modulator to activate each of the slave power stages to prevent a decrease in the output voltage level.

In various embodiments that accomplish at least this object, a method to operate a multi-phase switched-mode power converter circuit begins with determining that all the master power stage and all the slave power stages are active and each phase current is following the target current generated by the master power stage. The total current supplied by the multi-phase switched-mode power converter circuit is estimated and the estimate of the total current is then compared with a phase shedding threshold current level. If the total current has fallen below a level such that the multi-phase switched-mode power converter circuit is no longer operating efficiently, the multiple slave power stages have their reference input terminal set to receive a phase zero target current reference signal and the multiple slave power stages decrease their output currents toward a zero level. When the total output current of the multiple slave power stages is compared and determined to have reached the zero level, the multiple slave power stages are deactivated. In some embodiments, rather than monitoring the output currents of the multiple slave power stages to determine that they have reached the zero level, the multiple slave power stages are deactivated after a predetermined period of time.

The master power stage is active and providing current to the load, while the multiple slave power stages are inactive. The total current supplied by the multi-phase switched-mode power converter circuit is again estimated and compared with a phase shedding threshold current level. If the total current remains below phase shedding threshold current level, the master power stage remains active and providing current to the load, while the multiple slave power stages remain inactive. When the total current is greater than the phase shedding threshold current level, the multiple slave power stages are activated and the master power stage and the multiple slave power stages are providing the total current.

When the multiple slave power stages have their reference input terminal set to receive a phase zero target current reference signal and the total current is greater than the phase shedding threshold current level, the multiple slave power stages are activated and the master power stage and the multiple slave power stages resume providing the total current.

In various embodiments of the method, the output voltage level is compared with an offset target voltage level that is less than the target voltage level controlling the output voltage level. If the output voltage level decreases as a result of the load current increasing precipitously, the multiple slave power stages are activated instantaneously to prevent a further decrease in the output voltage level. The comparison of the output voltage level with the offset target voltage level is performed simultaneously with the comparison of the total current with the phase shedding threshold current level when the multiple slave power stages are deactivated.

In various embodiments that accomplish at least this object, an apparatus is configured to execute the method to operate a multi-phase switched-mode power converter circuit described above.

DETAILED DESCRIPTION

Figure 1:
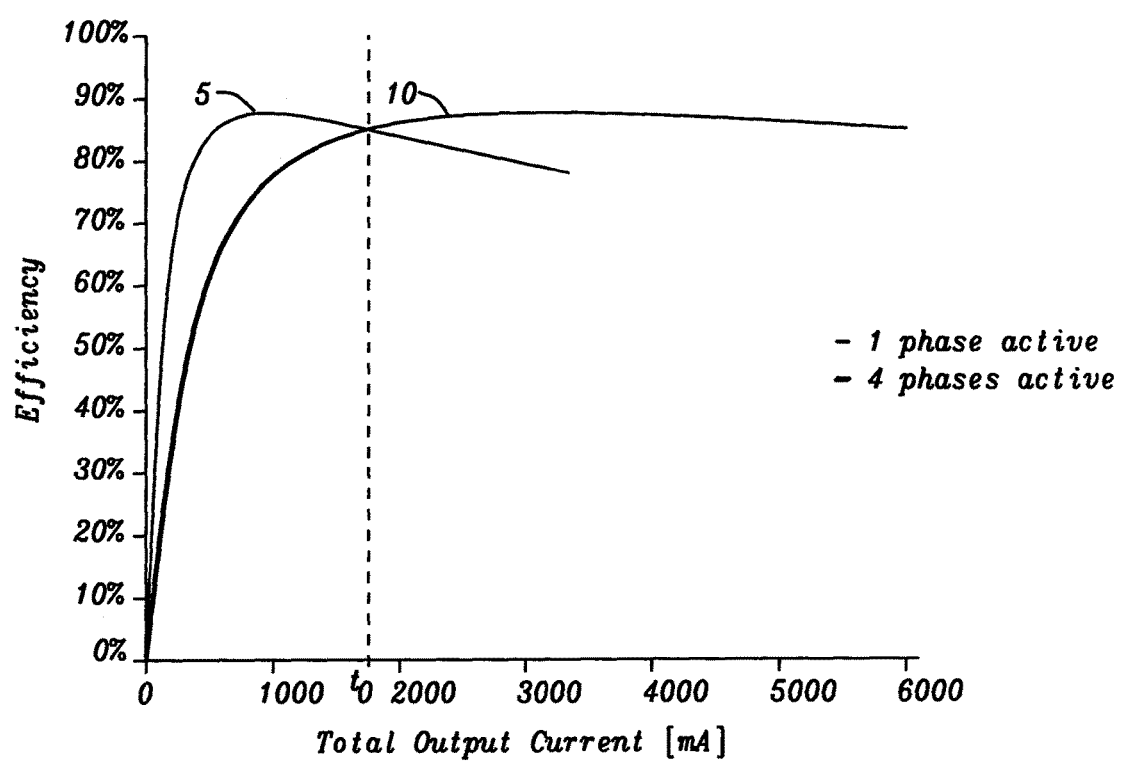
FIG. 1 is a plot of efficiency of a single phase switched-mode converter circuit and a four phase switched-mode converter circuit versus output current of the prior art.
Figure 2:
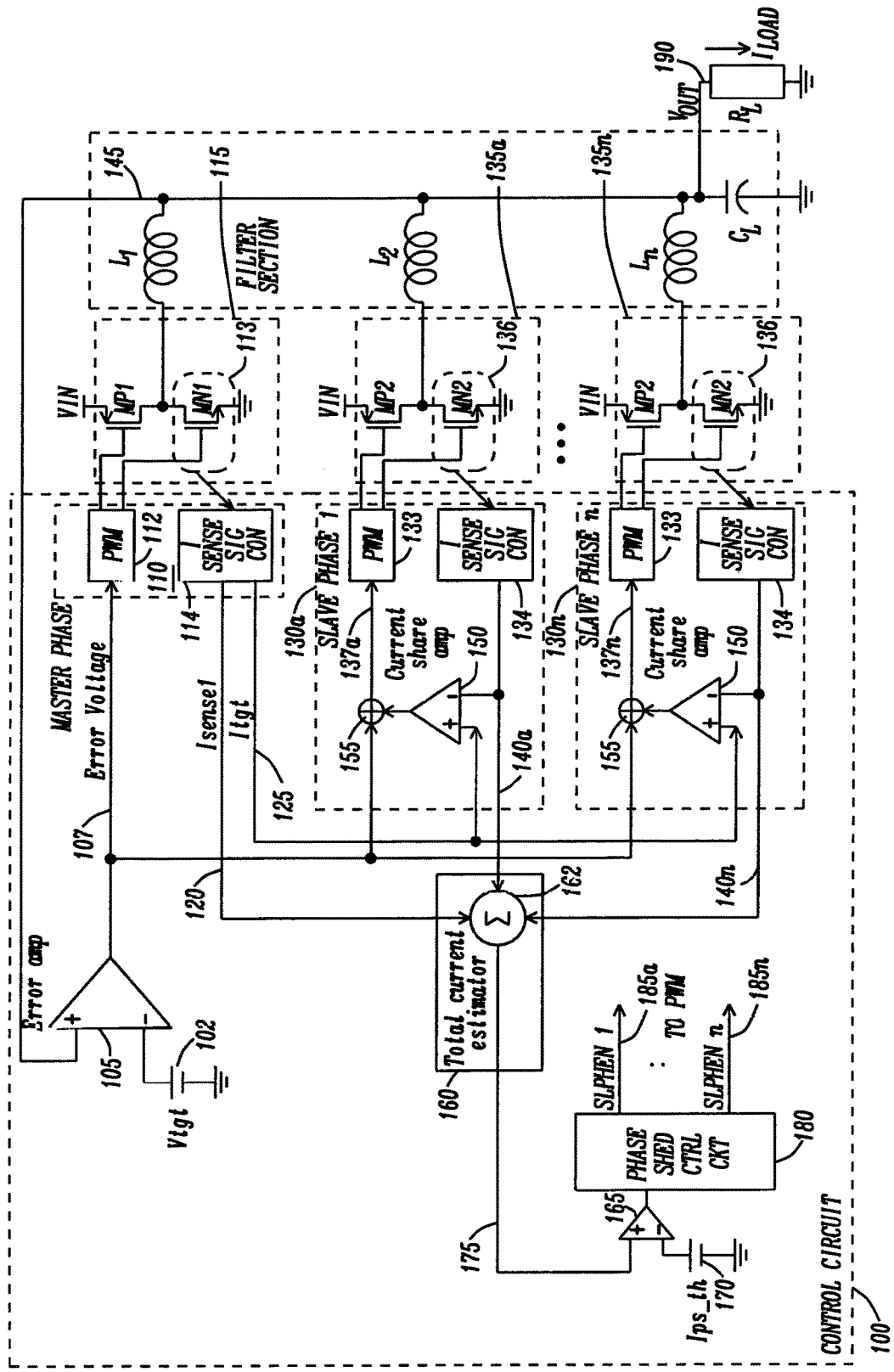
FIG. 2 is a schematic diagram of a multi-phase switched-mode converter circuit of the prior art.

FIG. 2 is a schematic diagram of a multi-phase switched-mode converter circuit of the prior art. The switched-mode converter circuit is structured as a multiphase buck switched-mode converter. The multiphase buck switched-mode converter has a control circuit 100, a master power stage 115, multiple slave power stages 135a, . . . , 135n, and a filter stage 145. The filter stage 145 has a master inductor $L_1$ and multiple stage inductors $L_2$, . . . , $L_n$ where a first terminal of each of the inductors $L_1$, $L_2$, . . . , $L_n$ is connected to one of the power stages 115, 135a, . . . , 135n. The second terminals of the inductors $L_1$, $L_2$, . . . , $L_n$ are commonly connected together and to the first plate of a load capacitor $C_L$. The second plate of the load capacitor $C_L$ is connected to the ground reference voltage source. The commonly connected second terminals of the inductors $L_1$, $L_2$, . . . , $L_n$ and the first plate of the load capacitor $C_L$ are connected to the load resistance $R_L$ through the output terminal 190. The load current $I_{LOAD}$ is the current flowing through the output terminal 190 to the load resistance $R_L$. The load current $I_{LOAD}$ is the total current through the output terminal 190.

The commonly connected second terminals of the inductors $L_1$, $L_2$, . . . , $L_n$ and the first plate of the load capacitor $C_L$ are connected to an input of the control circuit 100 to provide a feedback path for comparing the output voltage $V_{OUT}$ of the multiphase buck switched-mode converter with a target voltage level $V_{TGT}$. The control circuit 100 has an error amplifier 105 that receives the fed-back output voltage $V_{OUT}$ and the target voltage level $V_{TGT}$ from a biasing supply voltage source 102. The output of the error amplifier 105 is an error voltage 107 that is applied to a pulse width modulator 112 within the phase control and feedback section 110 associated with the master power stage 115.

The outputs of the pulse width modulator 112 within the phase control and feedback section 110 are applied to the master power stage 115. The master power stage 115 has a PMOS transistor MP1 and the NMOS transistor MN1. The source of the PMOS transistor MP1 is connected to the input supply voltage source VIN and the source of the NMOS transistor MN1 is connected to the ground reference voltage source. The commonly connected drains of the PMOS transistor MP1 and the NMOS transistor MN1 are connected to an input terminal of the filter section 145 that is a first terminal of an inductor $L_1$. The outputs of the pulse width modulator 112 within the phase control and feedback section 110 are applied to the gates of the PMOS transistor MP1 and the NMOS transistor MN1.

Each of the multiple slave power stages 135a, . . . , 135n are formed of a PMOS transistor MP2 and the NMOS transistor MN2. The source of the PMOS transistor MP2 is connected to the input supply voltage source VIN and the source of the NMOS transistor MN2 is connected to the ground reference voltage source. The commonly connected drains of the PMOS transistor MP2 and the NMOS transistor MN2 are each connected to an input terminal of the filter section 145 that is a first terminal of each inductor $L_2$, . . . , $L_n$.

The control circuit 100 includes the multiple phase control and feedback sections 130a, . . . , 130n, where each of the phase control and feedback sections 130a, . . . , 130n is connected to one of the slave power stages 135a, . . . , 135n. The outputs of the pulse width modulator 133 within each of the phase control and feedback sections 130a, . . . , 130n are applied to each of the gates of the PMOS transistor MP2 and the NMOS transistor MN2 of the slave power stages 135a, . . . , 135n.

The master power stage 110 has a current sensor 113 that senses the current flowing within the NMOS transistor MN1 of the master power stage 115. Similarly, each multiple slave power stage 135a, . . . , 135n has a current sensor 136 that senses the current flowing within the NMOS transistor MN2 of each of the slave power stages 135a, . . . , 135n. The current sensor 113 is connected to a current sense signal conditioning circuit 114 within the phase control and feedback section 110 that generates a phase target current level 125 that defines the share of the current for each of the multiple slave power stages 135a, . . . , 135n. The phase target current level $I_{TGT}$ is provided to a non-inverting input of a current share amplifier 150 within the phase control and feedback sections 130a, . . . , 130n. The output 140a, . . . 140n of the current sense signal conditioning circuit 134 of each of the phase control and feedback sections 130a, . . . , 130n is a phase sensed current level and is applied to the inverting input of the associated current share amplifier 150. The output of the current share amplifier 150 within each of the phase control and feedback sections 130a, . . . , 130n determines the difference between the phase target current level $I_{TGT}$ and the phase sensed current level 140a, . . . 140n from each of the slave power stages 135a, . . . , 135n. The difference output of the current share amplifier 150 is applied to the summation circuit 155. The summation circuit 155 combines the error voltage 107 and the difference between the phase target current level $I_{TGT}$ and the phase sensed current level 140a, . . . 140n. The combination signal 137a, . . . , 137n is applied to the pulse width modulator 133 of each of the multiple slave power stages 135a, . . . , 135n to determine the pulse width of the driving signals transferred to the gates of the PMOS transistor MP2 and the NMOS transistor MN2 of the slave power stages 135a, . . . , 135n.

The master current sense signal conditioning circuit 114 provides a master sensed current signal 120 indicative of the magnitude of the current flowing in the NMOS transistor MN1. The current sense signal conditioning circuit 134 of each of the multiple phase control and feedback sections 130a, . . . , 130n provides a phase sensed current signal 140a, . . . 140n indicative of the current flowing in the NMOS transistor MN2 of the slave power stages 135a, . . . , 135n. The master sensed current signal 120 and the phase sensed current signals 140a, . . . 140n are transferred to the summation circuit 162 of the total current estimator 160. The summation circuit 162 combines the master sensed current signal 120 and the phase sensed current signals 140a, . . . 140n to generate and a total current estimate signal 175 that is applied to a non-inverting input of a phase threshold comparator 165. A phase shedding threshold level $I_{PS\_TH}$ is applied to an inverting input of the phase threshold comparator 165. The output of the phase threshold comparator 165 is applied to the phase shedding control circuit 180 to generate the slave phase enable signals 185a, . . . , 185n. The slave phase enable signals

185a, ..., 185n are applied to the pulse width modulator 133 within each of the multiple phase control and feedback sections 130a, ..., 130n.

Phase shedding control circuit 180 enables or disables the multiple slave power stages 135a, ..., 135n according to the output of the total current estimator 160. If the total current estimate signal 175 indicates that the total current at the output terminal 190 is larger than the phase shedding threshold level $I_{PS\_TH}$, more of the multiple slave power stages 135a, ..., 135n are activated. If the total current estimate signal 175 indicates that the total current at the output terminal 190 is lower than the phase shedding threshold level $I_{PS\_TH}$, some of the multiple slave power stages 135a, ..., 135n are deactivated. As a consequence, number of active multiple slave power stages 135a, ..., 135n is optimized in terms of the efficiency.

Figure 3:
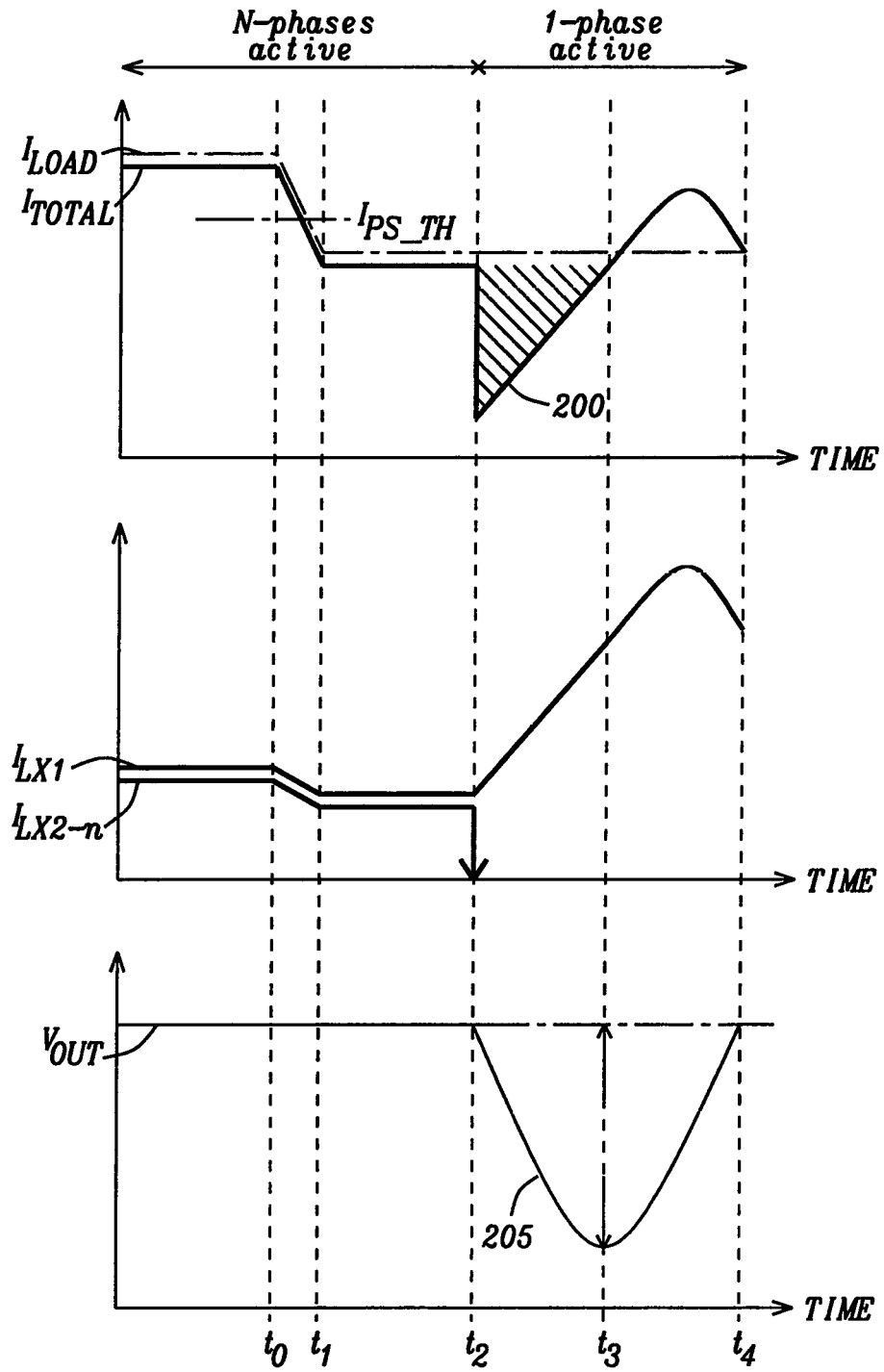
FIG. 3 is a plot of the operational timings of the signal levels at various points within the multi-phase switched-mode converter circuit of the prior art as shown in FIG. 2.

FIG. 3 is a plot of the operational timings of the signal levels at various points within the multi-phase switched-mode converter circuit of the prior art as shown in FIG. 2. The load current $I_{LOAD}$ is the current flowing from the output terminal 190 and the total current $I_{TOTAL}$ is the sum of the currents $I_{LX1}$ and $I_{LX2-n}$ flowing through the inductors $L_1$, $L_2$, ..., $L_n$. The plot of the current $I_{LX2-n}$ is for a single current through each of the inductors $L_2$, ..., $L_n$. At the time t0, the load current $I_{LOAD}$ begins to decrease. Nearly simultaneously, the total current $I_{TOTAL}$ begins to decrease as the currents $I_{LX1}$ and $I_{LX2-n}$ flowing through the inductors $L_1$, $L_2$, ..., $L_n$ begin to decrease. As the load current $I_{LOAD}$ stabilizes at a lower level at the time t1, the total current $I_{TOTAL}$ begins to stabilize as the currents $I_{LX1}$ and $I_{LX2-n}$ flowing through the inductors $L_1$, $L_2$, $L_n$ begin to stabilize. During the decrease of the load current $I_{LOAD}$, the total current $I_{TOTAL}$ passes through the phase shedding threshold level $I_{PS\_TH}$. The phase shedding control circuit 180 waits for a period of time from the time that the total current $I_{TOTAL}$ passes through the phase shedding threshold level $I_{PS\_TH}$ to the time t2 before deactivating or shedding the multiple slave power stages 135a, ..., 135n. At the time t2, currents $I_{LX1}$ and $I_{LX2-n}$ flowing through the inductors $L_1$, $L_2$, ..., $L_n$ decrease to zero (0) amps. The total current $I_{TOTAL}$ decreases precipitously 200 due to the sudden deactivation of the multiple slave power stages 135a, ..., 135n.

Although the error amplifier 105 attempts to compensate by increasing the current $I_{LX1}$ of the master power stage 115, a shortage 200 of the total current $I_{TOTAL}$ causes significant undershoot 205 of the output voltage $V_{OUT}$ between the time t2 and the time t3. At the time t3, the increase of the current $I_{LX1}$ of the master power stage 110 compensates for the decreased total current $I_{TOTAL}$ and the output voltage $V_{OUT}$ begins to increase from the time t3 to the time t4. When the output voltage $V_{OUT}$ has recovered to the desired voltage level, the current $I_{LX1}$ of the master power stage 115 stabilizes to provide the amount of current $I_{LOAD}$ required by the load resistance $R_L$.

The undershoot 205 is worse when the load current $I_{LOAD}$ is close to the phase shedding threshold level $I_{PS\_TH}$, as the step of the current $I_{LOAD}$ as seen by the load resistance $R_L$ and the load capacitor $C_L$ is larger. To avoid this undershoot 205, the phase shedding threshold level $I_{PS\_TH}$ should be reduced. However this reduction would worsen the efficiency of the multi-phase switched-mode converter circuit in total.

The purpose of this disclosure is to reduce the output voltage undershoot of the multi-phase switching converter with phase shedding as discussed above. This disclosure provides a multi-phase switched-mode converter circuit with phase dropping and adding function where the multiple slave power stages are dropped and added to optimize the efficiency. The control circuit determines the timing for disabling some of the slave power stages. In disabling some of the slave power stages, the output currents of those stages are decreased gradually so that the disabling does not affect the output voltage.

The multi-phase switched-mode converter circuit has a voltage control loop and current balance loop. The voltage control loop feeds back the voltage error to master power stage and to the multiple slave phase power stages. The current balance loop is implemented to control the master power stage and the multiple slave power stages. It feeds back the difference between the output current of each of the master power stage and the multiple slave power stages and the target current of each of the master power stage and the multiple slave power stages. Ordinarily the target is set to equalize the current distribution between each of the master power stage and the multiple slave phase power stages.

When disabling of some the multiple slave power stages is decided, the target currents of the multiple slave power stages are changed so that the output currents of the multiple slave power stages gradually become approximately zero before disabling to minimize the output voltage undershoot of the multi-phase switching converter.

Figure 4:
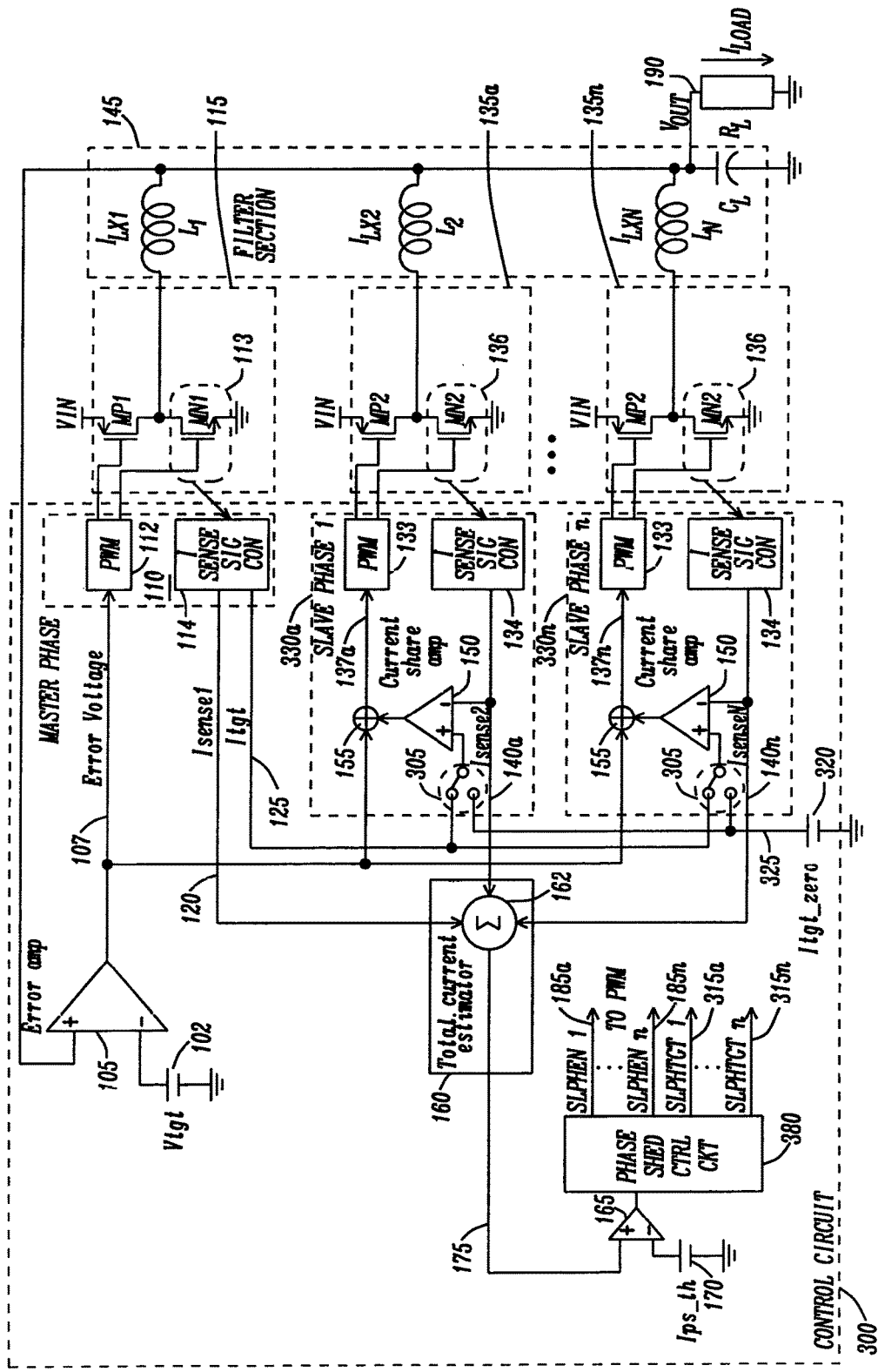
FIG. 4 is a schematic diagram of a multi-phase switched-mode converter circuit embodying the principles of this disclosure.

FIG. 4 is a schematic diagram of a multi-phase switched-mode converter circuit embodying the principles of this disclosure. The structure of the multi-phase switched-mode converter circuit embodying the principles of this disclosure is identical to that of the multi-phase switched-mode converter circuit of FIG. 2. The elements of FIG. 4 having common labeling to that of FIG. 2 are identical and perform the same function. These elements will not be discussed in detail other than how the elements of this disclosure impact their operation.

The control circuit 300 is configured as the control circuit 100 of FIG. 2 with the addition of the current target selector switch 305 to each of the phase control and feedback sections 330a, ..., 330n. The current target selector switch 305 has a common terminal connected to the non-inverting terminal of the current share amplifier 150. A first terminal of the current target selector switch 305 is connected to receive the phase target current level 125 and a second terminal of the current target selector switch 305 is connected to receive phase zero target current signal 325. The phase zero target current 325 is provided by the target current voltage source 320.

The phase shedding control circuit 380 is essentially structured as the phase shedding control circuit 180 of FIG. 2. The output of the phase threshold comparator 165 is applied to the phase shedding control circuit 380 to generate the slave phase enable signals 185a, ..., 185n. However, when the phase threshold comparator 165 indicates that the total current estimate signal 175 is less than the phase shedding threshold current $I_{PS\_TH}$, the phase shedding control circuit 380 activates the slave phase target signals 315a, ..., 315n to cause the control terminal of the current target selector switch 305 to switch the common terminal of the current target selector switch 305 to be connected to the phase zero target current level 325. When the output currents of the multiple slave power stages 335a, ..., 335n have decreased to nearly zero, the slave phase enable signals 185a, ..., 185n are then initiated to force the pulse width modulators 133 of the phase control and feedback sections 330a, ..., 330n to turn off the slave power stages 335a, ..., 335n.

Figure 5:
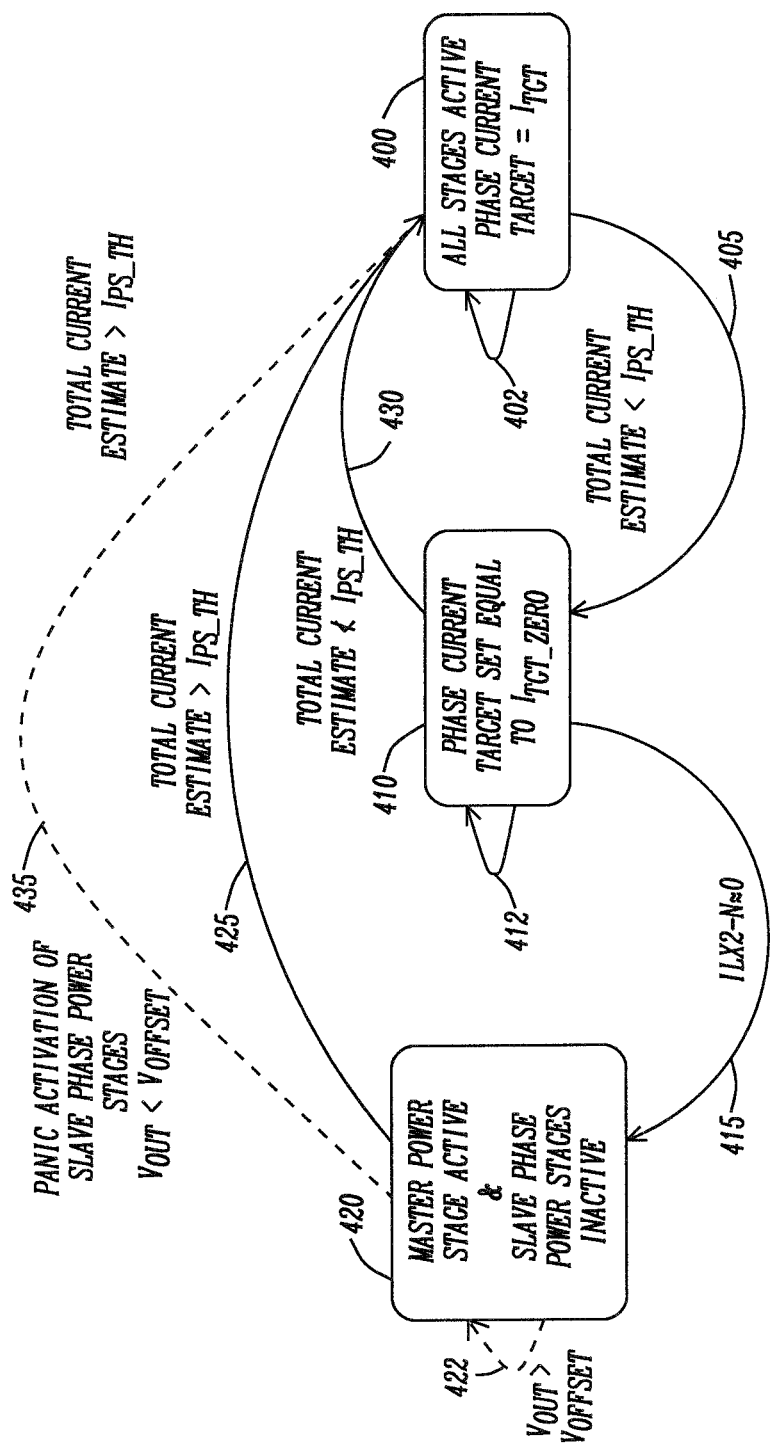
FIG. 5 is a state diagram of a phase shedding control circuit of the multi-phase switched-mode converter circuit embodying the principles of this disclosure shown in FIG. 4.

FIG. 5 is a state diagram of a phase shedding control circuit 380 of the multi-phase switched-mode converter circuit embodying the principles of this disclosure shown in FIG. 4. Upon the activation of the multi-phase switched-mode converter circuit for full operation, the phase shedding control circuit 380 assumes a first state 400 where the master power stage 115 and the multiple slave power stages 335a, . . . , 335n are all active and the phase currents are equal the phase target current level 125. At each cycling of a system clock, the phase shedding control circuit 380 verifies 402 that the total current estimate signal 175 is not less than the phase shedding threshold current $I_{PS\_TH}$ and continues this verification 402. When the total current estimate signal 175 is less than the phase shedding threshold current $I_{PS\_TH}$, state machine transfers 405 to a second state 410 that sets the target current for the multiple slave power stages 335a, . . . , 335n to be the phase zero target current level 325, At each cycling of the system clock, the phase shedding control circuit 380 verifies 412 that the multiple slave power stages 335a, . . . , 335n have not reached the current level of the zero target current level 325. If the total current estimate signal 175 indicates that the total current is not less than the phase shedding threshold current $I_{PS\_TH}$, the state machine transfers 430 back to the first state 400. The master power stage 115 and the multiple slave power stages 335a, . . . , 335n are all active and the phase currents are equal the phase target current level 125. When the current levels of the multiple slave power stages 335a, . . . , 335n are approximately equal to a zero level, the state transfers 415 to the third state 420 where the master power stage 110 is active and producing the target output voltage $V_{OUT}$ with the load current $I_{LOAD}$ as demanded by the load resistance $R_L$ and the multiple slave power stages 335a, . . . , 335n are all deactivated. When the total current estimate signal 175 indicates that the total current is greater than the phase shedding threshold current $I_{PS\_TH}$, the state machine transfers 430 back to the first state 400 and the process continues. In some embodiments, rather than monitoring the output currents of the multiple slave power stages 335a, . . . , 335n to determine that they have reached the zero level, the multiple slave power stages 335a, . . . , 335n are deactivated after a predetermined period of time.

Figure 6:
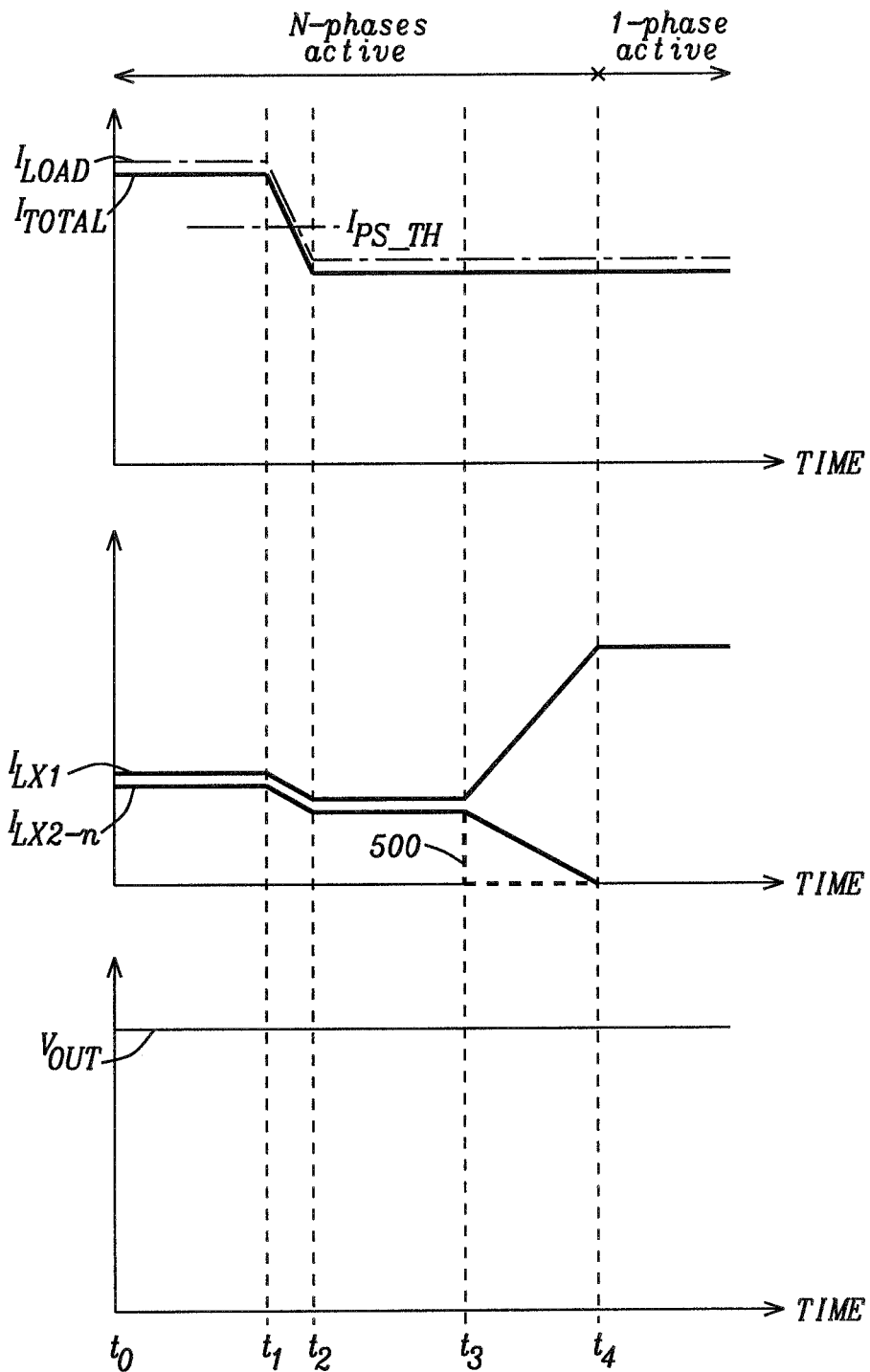
FIG. 6 is a plot of the operational timings of the signal levels at various points within the multi-phase switched-mode converter circuit of FIG. 4.

FIG. 6 is a plot of the operational timings of the signal levels at various points within the multi-phase switched-mode converter circuit of FIG. 4. At the time t0, the master power stage 115 and the multiple slave power stages 335a, . . . , 335n are all active and supplying the total current $I_{TOTAL}$ to meet the required load current $I_{LOAD}$. Between the time t1 and the time t2, the load current $I_{LOAD}$ decreases and the total current $I_{TOTAL}$ falls less than the phase shedding threshold current $I_{PS\_TH}$. The master power stage 115 and the multiple slave power stages 335a, . . . , 335n maintain the total current $I_{TOTAL}$ to meet the requirements of the load current $I_{LOAD}$ based on feedback signal of the error voltage 107 and the phase sensed current level 140a, . . . 140n until the time t3. When the phase shedding control circuit 380 determines that the decrease in the load current $I_{LOAD}$ decrease is not a transient excursion at the time t3, the phase shedding control circuit 380 activates the slave phase target signals 315a, . . . , 315n to have the current target selector switch 305 connect the phase zero target current signal 325 to the common terminal of the current target selector switch 305 such that the phase current target 500 is approximately zero. The output currents $I_{LX2-n}$ of the multiple slave power stages 335a, . . . , 335n begin to decrease. The output current $I_{LX1}$ of the master power stage 110 begins to increase to compensate for the change in the output currents $I_{LX2-n}$ of the multiple slave power stages 335a, . . . , 335n. At the time t4, the phase shedding control circuit 380 activates slave phase enable signals 185a, 185n to turn off the slave power stages 135a, 135n. The master power stage 110 provides the total load current $I_{LOAD}$.

Figure 7:
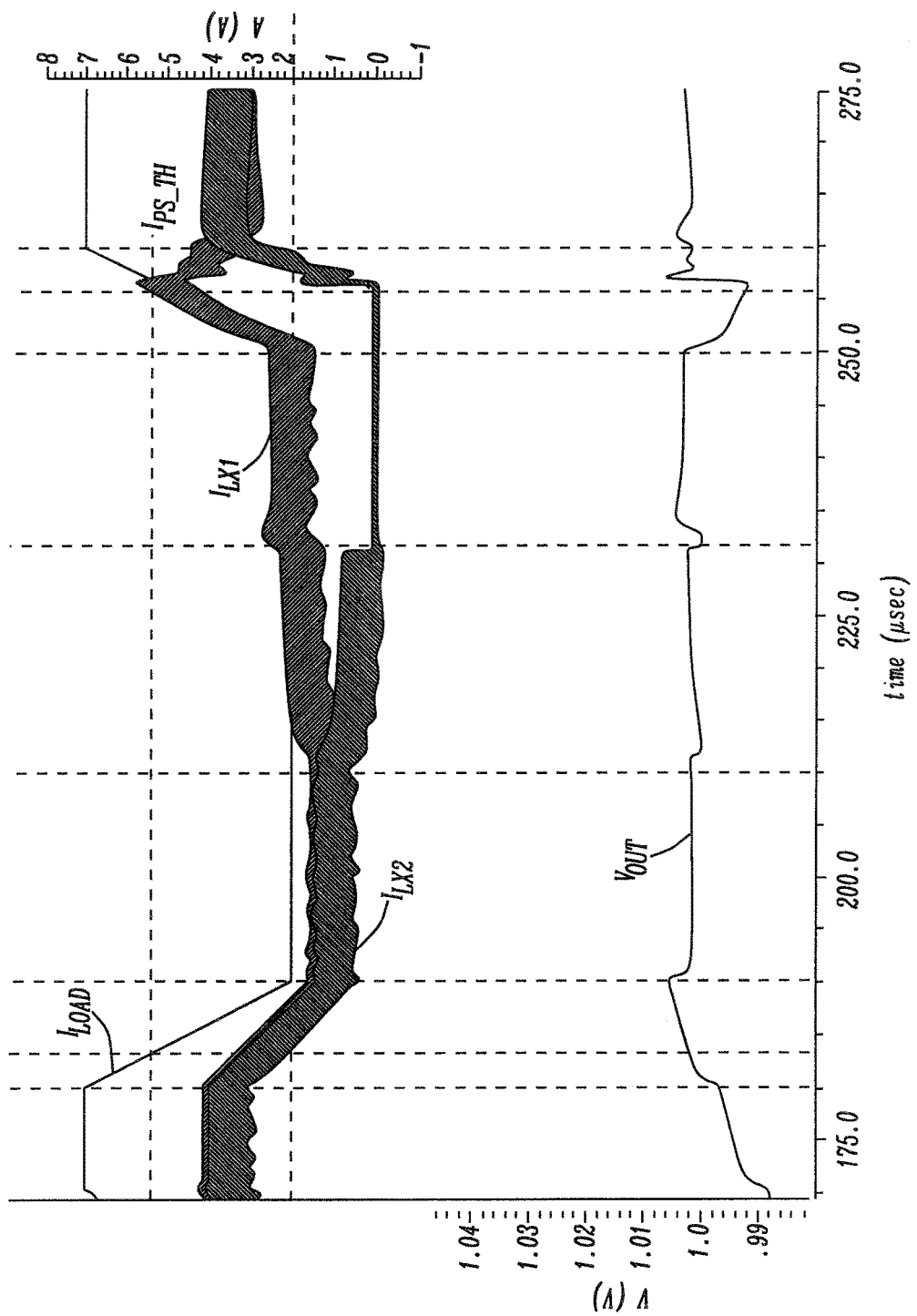
FIG. 7 is a plot of the results a simulation of the operation of the multi-phase switched-mode converter circuit of FIG. 4.

FIG. 7 is a plot of the results a simulation of the operation of the multi-phase switched-mode converter circuit of FIG. 4. In this instance of the multi-phase switched-mode converter circuit, there are two stages—the master power stage 115 and a single slave phase power stage 335a. At the beginning of the plot at approximately 170 μsec, the load current $I_{LOAD}$ is equal approximately 7 amperes. The load current $I_{LOAD}$ is equal to the sum of the current $I_{LX1}$ provided by the master power stage 115 and the current $I_{LX2}$ provided by the single slave phase power stage 335a. The current $I_{LX1}$ and the current $I_{LX2}$ are each equal to approximately 3.5 amperes.

At the time of approximately 180 μsec, the load current $I_{LOAD}$ begins to decrease and the current $I_{LX1}$ and the current $I_{LX2}$ are decreasing to match this change in the load current $I_{LOAD}$. At the time of approximately 183 μsec, the total current $I_{TOTAL}$ that is the sum of the current $I_{LX1}$ and the current $I_{LX2}$ becomes less than the phase shedding threshold current level $I_{PS\_TH}$. At the time of approximately 190 μsec, the load current $I_{LOAD}$ stabilizes at approximately 2 amperes and the current $I_{LX1}$ and the current $I_{LX2}$ stabilize at approximately 1 ampere each. After a period of approximately 20 μsec at the time of approximately 210 μsec, the single slave power stage 335a has its phase current target current set to approximately zero. The output current $I_{LX2}$ of the single slave power stage 335a decreases to approximately zero amperes. During this time, the current $I_{LX1}$ of the master power stage 115 increases to be equal to the current $I_{LOAD}$ or approximately the 2 amperes. At the time of approximately 230 μsec, the single slave phase power stage 335a is disabled and its output current $I_{LX2}$ becomes the zero amperes. With the master power stage 115 functioning and the single slave power stage 335a disabled, the multi-phase switched-mode converter circuit is operating in a more efficient mode.

At the time of approximately 250 μsec, the load current $I_{LOAD}$ begins to increase and the current $I_{LX1}$ increases to match this change in the load current $I_{LOAD}$. At the time of approximately 255 μsec, the load current $I_{LOAD}$ traverses the phase shedding threshold current level $I_{PS\_TH}$. The single slave power stage 335a is enabled and rises such that the output current $I_{LX2}$ is approximately one half of the load current $I_{LOAD}$. The current $I_{LX1}$ of the master power stage 115 decreases until it is approximately one half of the load current $I_{LOAD}$. At the time of approximately 260 μsec, the load current $I_{LOAD}$ stabilizes at a current of approximately 7 amperes and the current $I_{LX1}$ and the current $I_{LX2}$ stabilize to a current of approximately 3.5 amperes.

Figure 8:
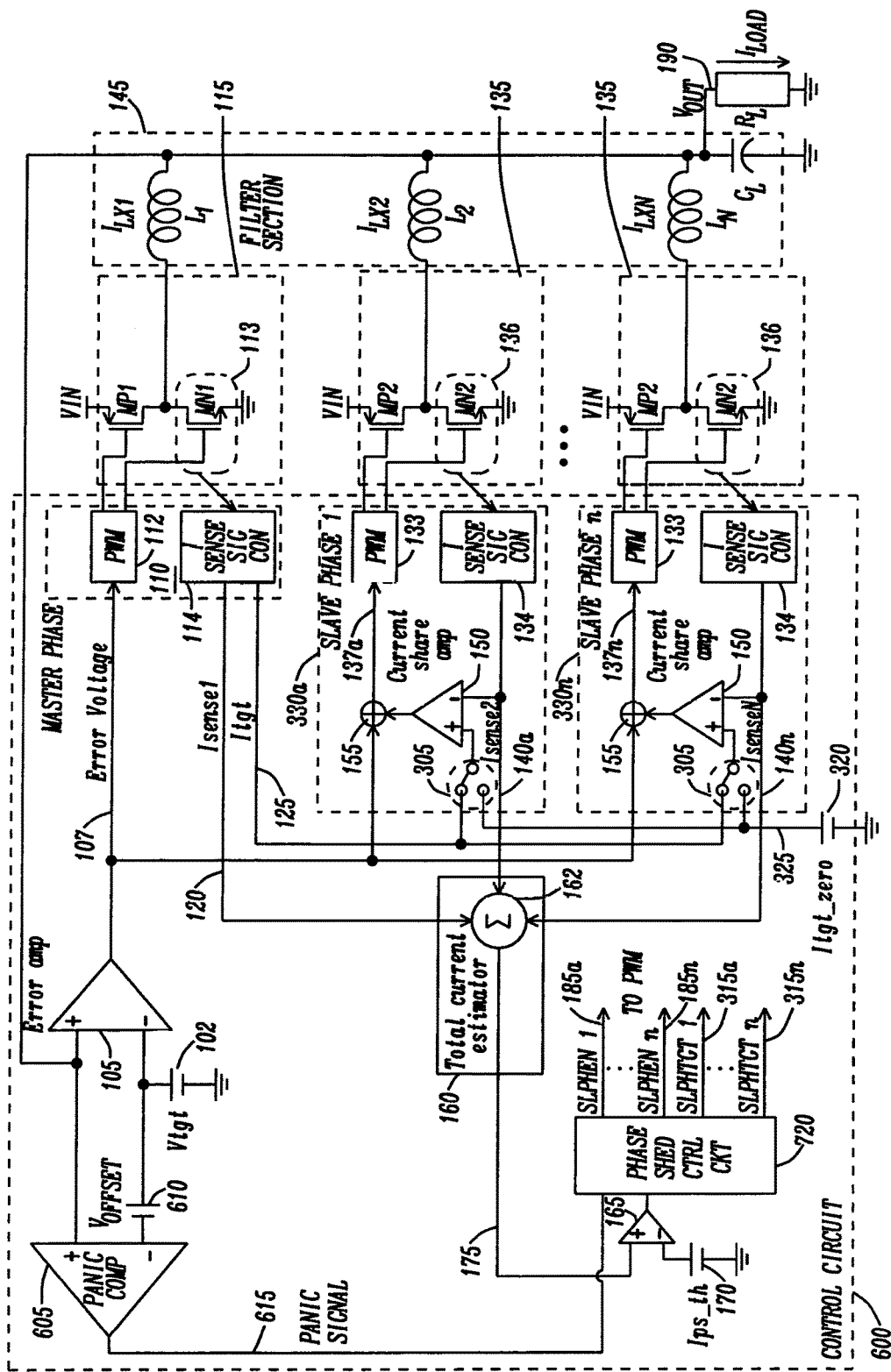
FIG. 8 is a schematic diagram of a multi-phase switched-mode converter circuit embodying the principles of this disclosure.

FIG. 8 is a schematic diagram of a multi-phase switched-mode converter circuit embodying the principles of this disclosure. The structure of the multi-phase switched-mode converter circuit embodying the principles of this disclosure is identical to that of the multi-phase switched-mode converter circuit of FIG. 4 with the exception of the control circuit 600. The elements of FIG. 8 having common labeling to that of FIG. 4 are identical and perform the same function. These elements will not be discussed in detail other than how the elements of this disclosure impact their operation. In FIG. 7, between the times of approximately 250 μsec and approximately 255 μsec, the output voltage has a relatively large undershoot due to shortage of the total output current $I_{TOTAL}$. To compensate for this sudden undershoot, a panic comparator 605 is added to the control circuit 600 and has its inverting input connected to receive the output voltage $V_{OUT}$. The positive terminal of the biasing supply voltage source 102 is connected to a positive terminal of an offset voltage source 610. For this example, the negative terminal of the offset voltage source 610 is connected to the non-inverting terminal of the panic comparator 605. The output voltage $V_{OUT}$ is compared to an offset voltage $V_{OFFSET}$. The offset voltage $V_{OFFSET}$ is the difference between the voltage level $V_{TGT}$ and the voltage level of the offset voltage source 610. However, the offset voltage source 610 may be a separate voltage source. When the output voltage $V_{OUT}$ is less than the offset voltage $V_{OFFSET}$, the panic comparator 605 activates the panic signal 615. The panic signal 615 is connected to the phase shedding control circuit 720. When the panic signal 615 is activated, the phase shedding control circuit 720 immediately activates the slave phase enable signals 185a, ..., 185n. The slave phase enable signals 185a, ..., 185n are transferred to the pulse width modulator 133 of each of the phase control and feedback sections 130a, ..., 130n connected to each of the multiple slave power stages 135a, ..., 135n to activate the multiple slave power stages 135a, ..., 135n to ensure that the shortage of the total output current $I_{TOTAL}$ does not occur. This prevents the relatively large undershoot due to shortage of the total output current $I_{TOTAL}$ between the times of approximately 250 µsec and approximately 255 µsec, as shown in FIG. 7.

Referring back to FIG. 5, the state machine of the phase shedding control circuit 380 describes a method to operate a multi-phase switched-mode power converter circuit embodying the principles of this disclosure. The method to operate a multi-phase switched-mode power converter circuit begins with determining 402 that the master power stage 115 and all the slave power stages 135a, ..., 135n are active and each phase current is following the target current $I_{TGT}$ 125 generated by the master power phase 115. The total current 175 supplied by the multi-phase switched-mode power converter circuit is estimated and the estimate of the total current 175 is then compared 405 with a phase shedding threshold current level $I_{PS\_TH}$. If the total current 175 has fallen below a level such that the multi-phase switched-mode power converter circuit is no longer operating efficiently, the multiple slave power phases 135a, ..., 135n have their reference input terminal set to receive a phase zero target current $I_{TGT\_ZERO}$ reference signal and the multiple slave power stages 135a, ..., 135n to decrease their output currents toward a zero level. When the total output current of the multiple slave power phases 135a, ..., 135n is compared and determined 415 to have reached the zero level, the multiple slave power stages 135a, ..., 135n are deactivated 420 and the master power phase 115 is active providing the total load current $I_{LOAD}$.

In some embodiments, rather than monitoring the output currents of the multiple slave power stages 135a, ..., 135n to determine that they have reached the zero level, the multiple slave power stages 135a, ..., 130n are deactivated after a predetermined period of time.

The total current 175 supplied by the multi-phase switched-mode power converter circuit is again estimated and compared 425 with a phase shedding threshold current level $I_{PS\_TH}$. If the total current 175 remains below phase shedding threshold current level $I_{PS\_TH}$, the master power phase 115 remains active and providing current 420 to the load, while the multiple slave power stages 135a, ..., 130n remain inactive. When the total current 175 is greater than the phase shedding threshold current level $I_{PS\_TH}$, the multiple slave power stages 135a, ..., 135n are activated and the master power stage and the multiple slave phase power stages are providing 400 the total current.

When the multiple slave power stages 135a, ..., 135n have their reference input terminal set to receive a phase zero target current reference signal $I_{TGT\_ZERO}$ and the total current 175 is greater than the phase shedding threshold current level $I_{PS\_TH}$, the multiple slave power stages 135a, ..., 135n are activated and the master power stage 115 and the multiple slave power stages 135a, ..., 135n resume providing 400 the total current.

In various embodiments of the method, the output voltage level $V_{OUT}$ is compared 430 with an offset target voltage level $V_{OFFSET}$. If the output voltage level $V_{OUT}$ decreases as a result of the load current $I_{LOAD}$ increasing precipitously, the multiple slave power stages 135a, ..., 135n are activated 435 instantaneously to prevent a further decrease in the output voltage level VOUT. The comparison of the output voltage level $V_{OUT}$ with the offset target voltage level $V_{TGT}$ is performed simultaneously with the comparison of the total current 175 with the phase shedding threshold current level $I_{PS\_TH}$ when the multiple slave power stages 135a, ..., 135n are deactivated.

While this disclosure has been particularly shown and described with reference to the preferred embodiments thereof, it will be understood by those skilled in the art that various changes in form and details may be made without departing from the spirit and scope of the disclosure. In particularly, the embodiments, as shown, are a buck multi-phase switched-mode converter circuit. However, any type of multi-phase switched-mode converter circuit such as boost multi-phase switched-mode converter circuit, buck-boost multi-phase switched-mode converter circuit, and any multi-phase switched-mode converter circuit topology that is known by a person skilled in the art is in keeping with the intent of this disclosure.

What is claimed is:

1. A multi-phase switched-mode converter circuit configured for dropping or shedding and adding phases to dynamically maintain an operating load while continuing to provide efficient operation and avoid any transient changes to an output voltage multi-phase switched-mode converter circuit, the multi-phase switched-mode converter circuit comprising:
   a control circuit configured to adjust operational signals of a master power stage and a plurality of slave power stages of the multi-phase switched-mode converter circuit, the control circuit comprising:
   a phase shedding control circuit configured to receive a shed threshold signal from a phase threshold comparator indicating that a total output current magnitude has fallen below a total current magnitude threshold level such that the multi-phase switched-mode power converter circuit is no longer operating efficiently and configured to generate a plurality of phase shedding signals and a plurality of slave phase target signals, wherein each of the plurality of phase shedding signal is transferred to one of the plurality of slave power stages; and
   a plurality of phase control and feedback sections where in a master phase control and feedback section is connected to the master power stage and each remaining phase control and feedback section is connected to one of the plurality of slave power stages, wherein each of the plurality of phase control and feedback sections comprises:
   a slave phase shedding switch comprising:
   a common switching pole in communication with a current share amplifier of one of the slave power stages, a first select pole connected to receive a phase target current level from a phase current sense circuit within the master power phase, a second select pole connected to receive a phase zero target current level from a target current voltage source, and a control terminal connected to receive one of the slave phase target signals from the phase shedding control circuit such that the slave phase shedding switch transfers a connection between the first pole and the common pole when the plurality of slave power stages are operating to a connection between the second pole and the common pole to apply the phase zero target current level to a current sense amplifier within each phase control and feedback section to bring an output current of each of the plurality of slave power stages to approximately a zero level.

2. The multi-phase switched-mode converter circuit of claim 1 wherein when the output current of each of the plurality of slave power stages is approximately the zero level, the phase shedding control circuit enables the plurality of phase shedding signals transferred to a plurality of pulse width modulators in the phase control and feedback sections to disable the plurality of slave power stages.

3. The multi-phase switched-mode converter circuit of claim 1 wherein if the shed threshold signal indicates that the total output current magnitude is not below the total current magnitude threshold level, each of the plurality of phase shedding signals is deactivated and each of the plurality of slave phase target signals is deactivated such that each of the slave phase shedding switches transfers the common pole from the second pole to the first pole such that the phase target current level is applied to the pulse width modulator of each of the phase control and feedback sections for determining the output current level of each of the slave power stages.

4. The multi-phase switched-mode converter circuit of claim 1 wherein the control circuit further comprises:
a panic comparator connected to receive an output voltage signal at a first input and a panic offset threshold level at a second input and configured to instantaneously activate the disabled plurality of slave power stages when the load current increases causing the output voltage signal to decrease precipitously.

5. The multi-phase switched-mode converter circuit of claim 4 wherein the panic converter is configured to generate a panic initiation signal that is transferred to the phase shedding control circuit to activate each of the slave power stages to prevent a decrease in the output voltage level.

6. The multi-phase switched-mode converter circuit of claim 1 wherein the multi-phase switched-mode converter circuit is a buck multi-phase switched-mode converter circuit, a boost multi-phase switched-mode converter circuit, a buck-boost multi-phase switched-mode converter circuit, or any multi-phase switched-mode converter circuit topology.

7. A control circuit configured to adjust operational signals of a master power stage and a plurality of slave power stages of a multi-phase switched-mode converter circuit, the control circuit comprising:
a phase shedding control circuit configured to receive a shed threshold signal from a phase threshold comparator indicating that a total output current magnitude has fallen below a a total current magnitude threshold level such that the multi-phase switched-mode power converter circuit is no longer operating efficiently and configured to generate a plurality of phase shedding signals and a plurality of slave phase target signals, wherein each of the plurality of phase shedding signal is transferred to one of the plurality of slave power stages; and a plurality of phase control and feedback sections where in a master phase control and feedback section is connected to the master power stage and each remaining phase control and feedback section is connected to one of the plurality of slave power stages, wherein each of the plurality of phase control and feedback sections comprises:

a slave phase shedding switch comprising:
a common switching pole in communication with a current share amplifier of one of the slave power stages, a first select pole connected to receive a phase target current level from a phase current sense circuit within the master power phase, a second select pole connected to receive a phase zero target current level from a target current voltage source, and a control terminal connected to receive one of the slave phase target signals from the phase shedding control circuit such that the slave phase shedding switch transfers a connection between the first pole and the common pole when the plurality of slave power stages are operating to a connection between the second pole and the common pole to apply the phase zero target current level to each of the plurality of current sense amplifiers to cause an output current of each of the plurality of slave power stages to approximately a zero level.

8. The control circuit of claim 7 wherein when the output current of each of the plurality of slave power stages is approximately the zero level, the phase shedding control circuit enables the plurality of phase shedding signals to disable the plurality of slave power stages.

9. The control circuit of claim 7 wherein if the shed threshold signal indicates that the total output current magnitude is not below the total current magnitude threshold level, each of the plurality of phase shedding signals is deactivated and each of the plurality of slave phase target signals is deactivated such that each of the slave phase shedding switches transfers the common pole from the second pole to the first pole such that the phase target current level is applied to each of the slave power stages for determining the output current level of each of the slave power stages.

10. The control circuit of claim 7 wherein the control circuit further comprises:
a panic comparator connected to receive an output voltage signal at a first input and a panic offset threshold level at a second input and configured to instantaneously activate the disabled plurality of slave power stages when the load current increases causing the output voltage signal to decrease precipitously.

11. The control circuit of claim 10 wherein the panic converter is configured to generate a panic initiation signal that is transferred to the phase shedding control circuit to activate each of the slave power stages to prevent a decrease in the output voltage level.

12. The control circuit of claim 7 wherein the multi-phase switched-mode converter circuit is a buck multi-phase switched-mode converter circuit, a boost multi-phase switched-mode converter circuit, a buck-boost multi-phase switched-mode converter circuit, or any multi-phase switched-mode converter circuit topology.

13. A method to operate a multi-phase switched-mode power converter circuit comprising the steps of:
   determining that a master power stage and a plurality of slave stages are active and each slave phase current is following a target current generated by the master power stage;
   determining an estimate of a total current supplied by the multi-phase switched-mode power converter circuit;
   comparing the estimate of the total current with a phase shedding threshold current level;
   when the total current has fallen below a level such that the multi-phase switched-mode power converter circuit is no longer operating efficiently, setting a reference input terminal of each of the plurality of slave phase power stages to receive a phase zero target current reference signal causing the plurality of slave power stages to decrease their output currents toward a zero level; and
   deactivating the plurality of slave power stages;
   wherein the master power stage is active and providing current to the load.

14. The method of claim 13 wherein the step of deactivating the plurality of slave power stages is executed when the total output current of the plurality of slave phase power stages has reached the zero level.

15. The method of claim 13 wherein the step of deactivating the plurality of slave power stages is executed after a predetermined period of time.

16. The method of claim 13 further comprising the steps of:
   estimating the total current supplied by the multi-phase switched-mode power converter circuit; and
   comparing the estimated total current with the phase shedding threshold current level when the master power stage is active and providing current to the load and the plurality of slave power stages are inactive;
   when the total current remains below phase shedding threshold current level, maintaining the master power stage active and providing current to the load and the plurality of slave power stages inactive; and
   when the total current is greater than the phase shedding threshold current level, activating the plurality of slave phase power stages are activated such that the master power stage and the plurality of slave phase power stages are providing the total current.

17. The method of claim 13 further comprising the step of:
   when a reference input terminal of each of the plurality of slave phase power stages receives the phase zero target current reference signal and the total current is greater than the phase shedding threshold current level, activating the plurality of slave phase power stages such that the master power stage and the plurality of slave phase power stages resume providing the total current.

18. The method of claim 16 further comprising the steps of:
   comparing the output voltage level with an offset target voltage level;
   when the output voltage level decreases as a result of the load current increasing precipitously, activating the plurality of slave power stages instantaneously to prevent a further decrease in the output voltage level.

19. The method of claim 18 further comprising the step of:
   simultaneously performing the steps comparing the output voltage level with the offset target voltage level with the comparing of the total current with the phase shedding threshold current level when the plurality of slave power stages are inactive.

20. An apparatus to operate a multi-phase switched-mode power converter circuit comprises:
   means for determining that a master power stage and a plurality of slave stages are active and each slave phase current is following a target current generated by the master power stage;
   means for determining an estimate of a total current supplied by the multi-phase switched-mode power converter circuit;
   means for comparing the estimate of the total current with a phase shedding threshold current level;
   means for setting a reference input terminal of each of the plurality of slave phase power stages to receive a phase zero target current reference signal causing the plurality of slave power stages to decrease their output currents toward a zero level, when the total current has fallen below a level such that the multi-phase switched-mode power converter circuit is no longer operating efficiently; and
   means for deactivating the plurality of slave power stages;
   wherein the master power stage is active and providing current to the load.

21. The apparatus of claim 20 wherein the means for deactivating the plurality of slave power stages is activated when the total output current of the plurality of slave phase power stages has reached the zero level.

22. The apparatus of claim 20 wherein the means for deactivating the plurality of slave power stages is executed after a predetermined period of time.

23. The apparatus of claim 20 further comprising:
   means for estimating the total current supplied by the multi-phase switched-mode power converter circuit; and
   means for comparing the estimated total current with the phase shedding threshold current level when the master power stage is active and providing current to the load and the plurality of slave power stages are inactive;
   when the total current remains below phase shedding threshold current level, maintaining the master power stage active and providing current to the load and the plurality of slave power stages inactive; and
   means for activating the plurality of slave phase power stages are activated such that the master power stage and the plurality of slave phase power stages are providing the total current, when the total current is greater than the phase shedding threshold current level.

24. The apparatus of claim 20 further comprising:
   means for activating the plurality of slave phase power stages such that the master power stage and the plurality of slave phase power stages resume providing the total current, when the plurality of slave phase power stages have their reference input terminal set to receive the phase zero target current reference signal and the total current is greater than the phase shedding threshold current level.

25. The apparatus of claim 24 further comprising:
   means for comparing the output voltage level with an offset target voltage level;
   means for activating the plurality of slave power stages instantaneously to prevent a further decrease in the output voltage level, when the output voltage level decreases as a result of the load current increasing precipitously.

26. The apparatus of claim 25 further comprising:
means for simultaneously performing the steps comparing the output voltage level with the offset target voltage level with the comparing of the total current with the phase shedding threshold current level when the plurality of slave power stages are inactive.

\* \* \* \* \*